United States Patent [19]
Anderson

[11] 3,958,920
[45] May 25, 1976

[54] SYSTEM FOR CONTROLLING THE OPERATION OF A MULTIPLE HEARTH FURNACE

[75] Inventor: Robert J. Anderson, Charlotte, N.C.

[73] Assignee: Rust Engineering Company, Birmingham, Ala.

[22] Filed: June 3, 1975

[21] Appl. No.: 583,423

[52] U.S. Cl. .................................. 432/23; 110/12; 432/48; 432/139; 432/144
[51] Int. Cl.² ........................ F27B 9/02; F23G 3/06
[58] Field of Search ................ 432/23, 36, 48, 133, 432/139, 144; 110/12

[56] References Cited
UNITED STATES PATENTS

| | | | |
|---|---|---|---|
| 1,840,723 | 1/1932 | King .................................. | 432/48 X |
| 2,788,754 | 4/1957 | Owen .................................. | 432/48 |

Primary Examiner—John J. Camby
Attorney, Agent, or Firm—Schuyler, Birch, Swindler, McKie & Beckett

[57] ABSTRACT

A system for controlling the operation of a multiple hearth furnace over a diverse range of operating conditions at a minimum level of energy consumption. Relatively low temperature gases are controllably recirculated from the drying zone to the combustion zone of the furnace, and/or gases are controllably discharged from the combustion zone and/or drying zone to regulate drying zone temperature, combustion zone temperature and the quantity of excess air required to provide optimum furnace operating conditions. The system is particularly useful for controlling the incineration in a multiple hearth furnace of sludge from waste water treatment plants.

26 Claims, 9 Drawing Figures

SYSTEM FOR CONTROLLING THE OPERATION OF A MULTIPLE HEARTH FURNACE

FIELD OF THE INVENTION

The present invention relates generally to systems for controlling the operation of multiple hearth furnaces, and specifically to a system for operating such a furnace in the most efficient manner possible. The invention is particularly applicable for controlling the incineration in a multiple hearth furnace of waste water treatment sludge and other slurries comprising mixtures of water, combustible organic materials, uncombustible inorganic materials, and other solid materials.

BACKGROUND OF THE INVENTION

The disposal of waste water treatment sludge has become an increasingly difficult problem. In the past, the usual solution to the problem has been to dump the sludge on land or at sea. However, with the present increasing emphasis on improved environmental quality standards, dumping is no longer a viable solution to the problem. Moreover, due to stricter water quality standards, the amount of waste water treatment sludge to be disposed of has been continuously increasing while the land and sea areas available for dumping such sludge has been continuously decreasing.

The foregoing factors have necessitated the development of alternative methods of disposing of waste water treatment sludge. One such alternative method which has become attractive from environmental and economic standpoint is incineration of the sludge. Incineration reduces the sludge to a low volume inert ash which may be easily handled and disposed of. Generally, after an initial filtration to concentrate the sludge, incineration requires that the sludge be dried and combusted in some type of furnace, and frequently requires an external source of heat energy, such as the energy produced by the combustion of a common fuel. Various types of furnaces and other heating equipment have been used for incinerating sludge, such as multiple hearth furnaces, fluidized bed furnaces, travelling gate furnaces, atomized spray dryers and other heating equipment.

Another problem closely related to the disposal of waste water treatment sludge is the problem of treating slurries produced by various industrial processes. As with waste water treatment sludge, such slurries usually contain a relatively high percentage of water with varying percentages of organic and inorganic solid materials. Many such slurries contain valuable particulate solid materials which could be reused if recovered. Examples of this phenomena exist in the steel, aluminum, paper, chemical and petrochemical industries. One specific example is with respect to the process of extracting aluminum from its ore. In this process cryolite, a mineral consisting of sodium-aluminum floride, is used to form a molten bath in an electric reduction furnace. Small amounts of cryolite particles are entrained in the gases evolved from the reduction reaction and are collected in a gas cleaning system after such particles leave the furnace. In addition to cryolite particles, the evolved gases contain carbon particles and various organic materials. After collection in the gas cleaning system, the cryolite and carbon particles and organic materials are mixed with water to form a slurry. The slurrry is dried, and the carbon particles and organic materials are combusted in a multiple hearth furnace. The regenerated cryolite is taken from the furnace and returned as fresh makeup to the electric reduction furnace. This cryolite regeneration process and other similar processes in the above-listed industries usually are borderline from an economic standpoint and require the most efficient utilization of energy possible.

DESCRIPTION OF THE PRIOR ART

Of all of the apparatus presently available for drying and combusting the combustible materials contained in waste water treatment sludge and other slurries, the multiple hearth furnace has proved to be the most promising. As shown in VonDreusche U.S. Pat. No. 3,153,663, a multiple hearth furnace conventionally comprises a cylindrical steel shell lined with a refractory material. A plurality of vertically superposed hearths made from a refractory material are positioned within the furnace. A hollow rotatable shaft extends upwardly through the center of the furnace and the hearths positioned therein. The shaft has a plurality of rabble arms affixed thereto which extend over the respective hearths. The hearths have alternating inner and outer openings so that when the rabble arms are rotated with the shaft, the material being treated moves alternately spirally inwardly and outwardly on adjacent hearths and downwardly through the openings in the hearths. The rabble arms in addition to moving the material across the hearths also break up any large particles and thereby facilitate drying and combustion by exposing a greater surface area of the material to the interior environment of the furnace.

Operated under normal conditions for the incineration of waste water treatment sludge, a multiple hearth furnace has three substantially distinct operating zones:

a. An upper drying zone, usually defined by two or more upper hearths, in which a major portion of the free water contained in the sludge is evaporated;

b. An intermediate combustion zone, usually defined by two or more intermediate hearths, in which the combustible material contained in the sludge is combusted; and c. A lower cooling zone, usually defined by a bottom hearth, in which the solid residue uncombusted in the combustion zone is cooled by gases cooler than the gases produced by the combustion.

Frequently, the gas employed for cooling the uncombusted residue is air which previously has been circulated through the central shaft for cooling the shaft.

Gases flow upwardly from the combustion zone, countercurrent to the downward flow of solid materials. With respect to a hearth having an inner opening, the gases flow upwardly through the opening, above and outwardly across the sludge or slurry on the hearth, and upwardly through the outer opening of the vertically adjacent upper hearth. With respect to a hearth having an outer opening, the gases flow upwardly through the opening, above and inwardly across the sludge or slurry on the hearth, and upwardly through the inner opening of the vertically adjacent upper hearth. The gases continue to flow upwardly in this convoluted flow pattern, and ultimately pass out of the furnace through a gas outlet at the top thereof.

With respect to the incineration of waste water treatment sludge, in the drying zone the sludge attains a temperature in the range of approximately 100–180°F. and remains at this temperature as the water contained therein evaporates at approximately a constant rate until the water content of the sludge has been reduced to the range of approximately 30–40 percent by weight. The sludge then moves downwardly from the drying zone into the combustion zone and is combusted producing temperatures in the range of approximately 1,200°-1900°F.

Conventionally, operation of the furnace is controlled manually. The temperature in the combustion zone is limited to a predetermined maximum temperature by supplying a fixed quantity of air to such zone in excess of the amount of air required to provide the stoichiometric quantity of oxygen for completely combusting the combustible material contained in the sludge. Generally, the amount of such excess air supplied is approximately 100 percent of the air required to provide the stoichiometric quantity of oxygen. Also, auxiliary burners frequently are provided in the drying and/or combustion zones to make up any heat deficit in the drying and/or combustion of the sludge. Such burners generally are controlled through conventional fuel-air ratio type controllers which are manually set at the desired operating rate.

Such manual methods of control, while adequate in many situations, have not proven to be entirely satisfactory for all situations or the most economical for any situation. Sludge and slurries containing low melting point ash constituents require very close temperature control to prevent fusing and possible damage to the rabble arms and interior furnace structure. The only known methods for controlling the temperature in the combustion zone of the prior art furnaces are either to increase the quantity of excess air supplied or alternatively to add an additional cooling medium, such as water. Both of these methods result in a greater heat load on the furnace than is required by the mixing and combustion characteristics of the combustible material being incinerated. For sludge containing a relatively low quantity of combustible organic materials in relation to the contained quantity of water, either method will result in the use of large excessive quantities of fuel to adequately complete the drying process. For all sludge and slurries, such control methods will require larger combustion air blower and induced draft blower capacities and operating horsepowers than are required by the mixing and combustion characteristics of the material being incinerated. Additionally, the high temperatures generated in the combustion zone have a detrimental effect on the interior furnace structure and associated equipment. The furnace and associated equipment if properly designed, will, in fact, operate at such high temperatures, but if operated at lower temperatures would have extended useful operating lives and reduced maintenance problems.

SUMMARY OF THE INVENTION

The present invention obviates the control problems associated with the prior art multiple hearth furnace control systems, and comprises a method and apparatus for operating such furnaces at maximum efficiency and minimum energy consumption. The invention comprises a method and apparatus adapted for controlling the combustion of a combustible material in a multiple hearth furnace having a plurality of vertically superposed hearths defining an upper drying zone, an intermediate combustion zone and a lower cooling zone. As described hereinabove, conventionally a mixture containing the combustible material and water is introduced into the upper end of the furnace and is passed downwardly through the drying zone wherein the mixture is dried by exposure to gases heated in the combustion zone. The dried mixture is then passed downwardly from the drying zone through the combustion zone wherein the combustible material is combusted using air as the oxidant, and the gases produced by the combustion flow upwardly into the drying zone to provide heat for drying the mixture. Air is supplied to the combustion zone to provide oxygen for combusting the combustible material. The solid residue uncombusted by the combustion is passed downwardly from the combustion zone through the cooling zone wherein the residue is cooled by exposure to gases cooler than the gases produced by the combustion. Finally, the cooled residue is removed from the lower end of the furnace.

Specifically, the invention comprises a method and apparatus wherein gases are recirculated from the drying zone back into the combustion zone to provide relatively low temperature gases in the combustion zone for absorbing excess heat generated by the combustion, the temperature in the combustion zone is sensed, and the flow of the recirculated gases is controlled in response to such sensed temperature to provide the quantity of such gases in the combustion zone required to maintain the combustion zone temperature at a substantially constant predetermined temperature independently of the heat produced in such zone. Stated somewhat differently, the flow of the recirculated gases is controlled in response to the temperature in the combustion zone to provide the quantity of such gases in the combustion zone required to achieve a balance between the heat produced and the heat absorbed in such zone.

Additionally, the drying zone temperature may be controlled by controllably discharging gases directly from the combustion zone should the drying zone temperature exceed a predetermined maximum temperature. Preferably, such gases are discharged into an afterburner in which outlet gases from the combustion and/or drying zones are exposed to a predetermined minimum temperature for a predetermined minimum period of time to fully combust any uncombusted volatilized components of the combustible material. After treatment in the afterburner, such gases generally are scrubbed, cooled and discharged to atmosphere as a relatively cool, odorless gaseous mixture.

The temperature in the drying zone additionally may be controlled by controlling the amount of excess air supplied to the combustion zone in response to the temperature in the drying zone, and the temperature in the combustion zone may be additionally controlled by supplying excess air to the combustion zone either in response to the temperature in such zone or in response to the oxygen content of the recirculated gases.

Depending upon the composition of the sludge or slurry being treated, a conventional fuel, such as fuel oil, may be supplied to the combustion and/or drying zones to provide additional heat energy as required.

The system of the invention is applicable for controlling the operation of a multiple hearth furnace for both oxidation and reduction reactions.

Normally, the equipment associated with the furnace is designed for operation of the furnace at combustion zone temperatures in the range of approximately 1,200°–1,900°F. However, the method and apparatus of the invention may be employed for controlling the operation of the furnace at any temperature between ambient temperature and the maximum temperature to which the materials from which the furnace and associated equipment are constructed may be subjected.

With the foregoing in mind, it is an object of the present invention to provide a method and apparatus for controlling the operation of a multiple hearth furnace over a diverse range of operating conditions at maximum efficiency and minimum energy consumption.

It is a further object of the invention to provide a method and apparatus for controlling the operation of a multiple hearth furnace in such a manner that any desired combination of combustion zone and drying zone temperatures may be achieved.

It is another object of the invention to provide a method and apparatus for controlling the operation of a multiple hearth furnace wherein gases are controllably recirculated from the drying zone to the combustion zone to control both the combustion zone temperature and the quantity of excess air supplied to the combustion zone.

It is an additional object of the invention to provide a method and apparatus for controlling the operation of a multiple hearth furnace in such a manner that such operation is more economical than has heretofore been achieved.

These and other objects of the invention will be apparent from the following detailed description of the preferred embodiments therof given in connection with the following drawings in which like reference numerals are used for identifying like elements throughout.

DESCRIPTION OF THE PREFERRED EMBODIMENTS

Figure 1:
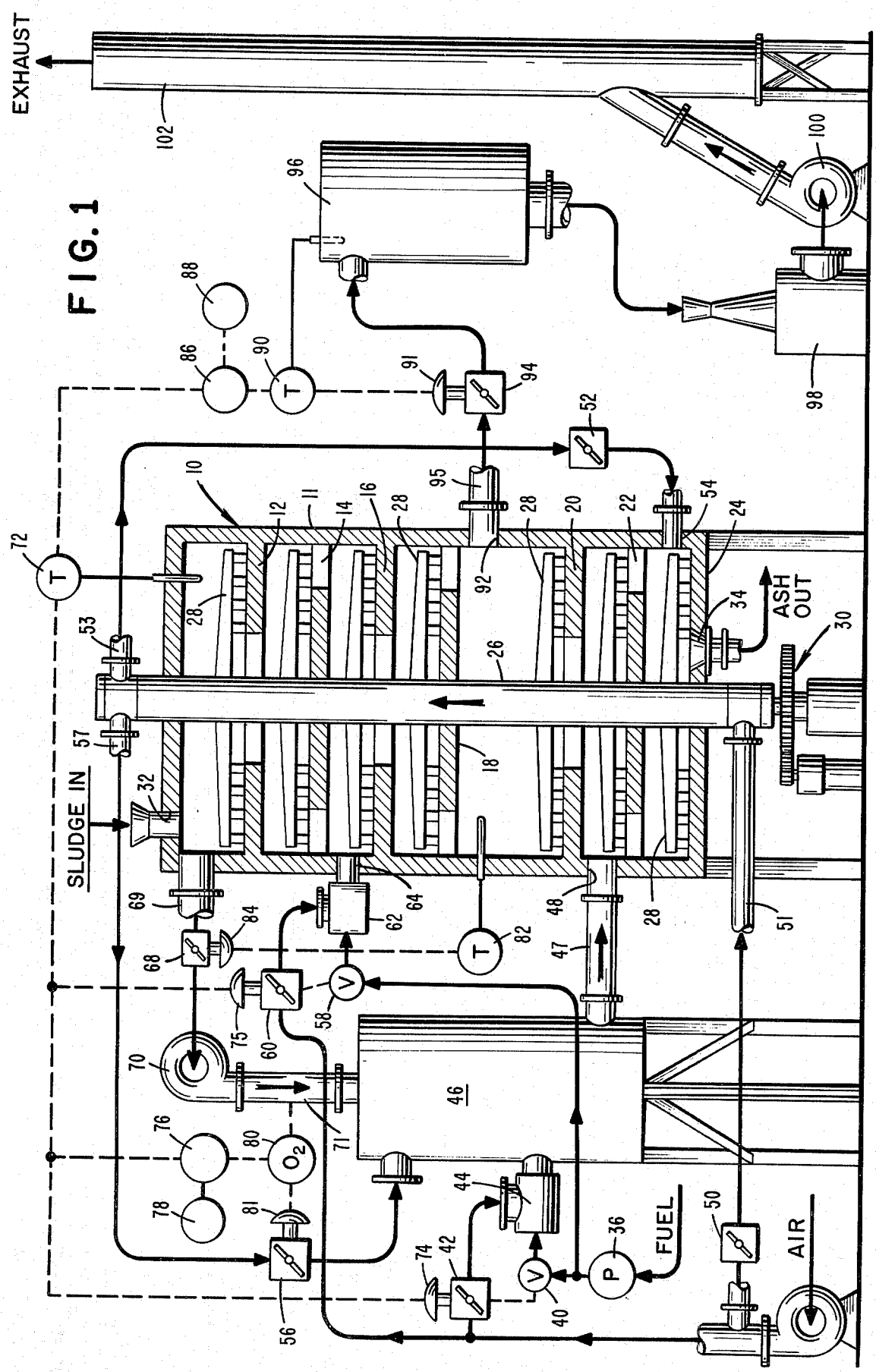
FIG. 1 is a sectional schematic view of a multiple hearth furnace employing a first embodiment of the control system of the invention.

The first embodiment of the invention is shown in FIG. 1, as employed with a multiple hearth furnace 10. Furnace 10 includes a steel, refractory lined, cylindrical body II, a plurality of upper hearths 12, 14, 16 and 18, which define an upper drying zone, a plurality of intermediate hearths 20 and 22, which define an intermediate combustion zone, and a lower hearth 24, which defines a lower cooling zone. Hearths 12,14,16,18,20 and 22 have alternating inner and outer openings, with hearths 12,16 and 20 having an inner opening and hearths 14,18 and 22 having an outer opening. A hollow, rotatable shaft 26 extends upwardly through the center of furnace 10 and the hearths positioned therein. Affixed to shaft 26 immediately above each of the hearths are a plurality of rabble arms 28. Shaft 26 and arms 28 affixed thereto are rotatably driven by a motor and gear arrangement 30. An opening 32 is formed in the top of the furnace through which the material to be treated is introduced into the furnace. Another opening 34 is formed at the bottom of the furnace through which uncombusted solid residue, i.e. ash, is removed from the furnace. The foregoing constitutes the basic structure of a conventional multiple hearth furnace.

The structural elements of the system of the invention will first be described and the method performed by the system will then be described in relation to such elements. A source 36 of conventional fuel, i.e. No. 2 fuel oil, is provided, and a conventional source of combustion air, such as combustion air blower 38, also is provided. Fuel and air are supplied via metering valves 40 and 42, respectively, to a burner 44. Burner 44 injects a fuel-air mixture into a combustion chamber 46. The gaseous products of combustion produced by the combustion of fuel and air are discharged from chamber 46 through a duct 47 into the combustion zone of the furnace through an opening 48 positioned between hearths 20 and 22. If desired the fuel-air mixture may be injected directly into the combustion zone. However, the use of combustion chamber 46 is preferred to avoid direct flame impingement and radiation on the interior furnace structure and to avoid the formation of slag and clinkers in the furnace.

Fuel and air also may be supplied via metering valves 58 and 60, respectively, to one or more burners 62 from which a fuel-air mixture may be injected into the drying zone of the furnace through one or more openings 64.

Combustion air blower 38 also supplies air via valve 50 and a duct 51 to the lower end of hollow shaft 26. Such air is circulated upwardly through the shaft to cool the latter during operation. A portion of the shaft cooling air discharged from the top of the shaft is directed via a valve 52 and a duct 53 to the cooling zone of the furnace through an opening 54 above hearth 24. Another portion of the air discharged from the top of the shaft is directed via a valve 56 and a duct 57 to combustion chamber 46.

An opening 66 is provided in the furnace at the top of the drying zone through which gases are discharged via a valve 68 and duct 69 into a recirculation blower 70. The discharged drying zone gases are thoroughly mixed in blower 70 from which such gases are directed into combustion chamber 46 via a duct 71.

Outlet gases are discharged from the furnace through an opening 92 in the combustion zone via a valve 94 and a duct 95 into an afterburner 96. Gases are discharged from afterburner 96 into a scrubbing and cooling system 98 from which such gases are withdrawn by an induced draft blower 100 and exhausted to the atmosphere via a stack 102.

A temperature sensor 72 is mounted in the upper end of the drying zone and is operatively connected to an actuator 74 for operating valves 40 and 42. Sensor 72 also is operatively connected to an actuator 75 for operating valves 58 and 60.

Additionally, sensor 72 is operatively connected to a selector 76. A minimum oxygen content controller 78 also is operatively connected to selector 76. Selector 76 is operatively connected to an oxygen controller 80, and the latter is operatively connected to an actuator 81 for operating valve 56. Selector 76 selects the signal of greater magnitude generated by either sensor 72 or controller 78. Selector 76 then sends a corresponding signal to controller 80 for controlling the operation of valve 56, thereby controlling the quantity of additional air supplied to combustion chamber 46. The term additional air as used in the specification and claims means air supplied to combustion chamber 46 (or the combustion zone) in addition to the combustion air directly supplied by combustion blower 38. The quantity of combustion air directly supplied by blower 38 may be more or less than stoichiometric requirements.

Controller 80 also measures the oxygen content of the recirculated drying zone gases directly through duct 71 from blower 70 to combustion chamber 46, for controlling, via actuator 81 and valve 56, the quantity of additional air supplied to combustion chamber 46 in response to the oxygen content of the recirculated drying zone gases.

A temperature sensor 82 is mounted in the combustion zone and is operatively connected to an actuator 84 for operating valve 68 in response to the temperature in the combustion zone.

Sensor 72 also is operatively connected to another selector 86. A minimum afterburner temperature controller 88 also is operatively connected to selector 86. Selector 86 is operatively connected to an afterburner temperature controller 90, and the latter is operatively connected to an actuator 91 for operating valve 94. Selector 86 selects the signal of greater magnitude generated by either sensor 72 or controller 88. Selector 86 then sends a corresponding signal to controller 90, and the latter sends a signal to actuator 91 for controlling the operation of valve 94, thereby controlling the quantity of combustion zone outlet gases discharged into afterburner 96.

The control system of the invention as described hereinabove is capable of controlling the operation of furnace 10 over a diverse range of operating conditions. With respect to the incineration of waste water treatment sludge, the sludge is introduced into the furnace through opening 32 and is passed through the drying zone defined by hearths 12, 14, 16 and 18 by the action of rotating rabble arms 28 and the influence of gravity.

As the sludge passes through the drying zone it dries at approximately a constant rate upon reaching a temperature in the range of approximately 100°–180°F. until the water content thereof has been reduced to the range of approximately 30–40 percent by weight. Upon reaching this moisture content, the temperature of the sludge rises rapidly and drying no longer occurs at a constant rate. Under ideal operating conditions, upon reaching this moisture content, the sludge leaves the drying zone and enters the combustion zone. The time required for the sludge to dry to an appropriate moisture content for entry into the combustion zone is a function of the initial water content of the sludge and the mean temperature difference between the gases in the drying zone and the sludge. In order for the sludge to enter the combustion zone at the desired moisture content, the drying time must equal the residence time in the drying zone. The residence time is a function of both the quantity of sludge being processed and the rotational velocity of shaft 26. The latter two parameters are determined on the basis of the initial water content of the sludge and the desired operating temperature in the drying zone. The desired drying zone operating temperature is then maintained as follows.

For the treatment of sludge and other slurries which require that an external source of heat energy be added to the furnace for carrying out the desired reaction, should the temperature in the drying zone become less than the desired operating temperature, sensor 72 sends a signal to actuator 74 and/or actuator 75, and such actuators operate valves 40 and 42 and/or valves 58 and 60 to increase the flow of fuel and air to the combustion and/or drying zone to thereby increase the temperature of the gases in the drying zone.

For the treatment of sludge and other slurries which do not require that an external source of heat energy be added to the furnace for carrying out the desired reaction, the quantity of additional air supplied to combustion chamber 46 is controlled to maintain the desired drying zone operating temperature. Normally, the magnitude of the signal sent to selector 76 from minimum oxygen content controller 78 is greater in magnitude than the signal sent to selector 76 from sensor 72. Therefore, the quantity of additional air supplied normally is determined by controller 78. However, should the temperature in the drying zone exceed the desired operating temperature, sensor 72 sends a signal to selector 76 which is greater in magnitude than the signal sent to the selector by controller 78. Selector 76 then selects the signal generated by sensor 72 and, via controller 80, actuator 81 and valve 56, increases the quantity of additional air supplied, thereby decreasing the temperature in the drying zone until the signal generated by controller 78 again exceeds the signal generated by sensor 72. When the latter occurs, the quantity of additional air supplied is again controlled by minimum oxygen content controller 78.

In addition, or alternatively to the above method of controlling the drying zone temperature, the quantity of outlet gases discharged from the combustion zone may be controlled to maintain the desired drying zone operating temperature. Normally, the magnitude of the signal sent to selector 86 from minimum afterburner temperature controller 88 is greater in magnitude than the signal sent to selector 86 from sensor 72. Therefore, the quantity of outlet gases discharged from the combustion zone normally is determined by controller 88. However, should the temperature in the drying zone exceed the desired operating temperature, sensor 72 sends a signal to selector 86 which is greater in magnitude than the signal sent to the selector by controller 88. Selector 86 then selects the signal generated by sensor 72 and, via controller 90, actuator 91 and valve 94, increases the quantity of outlet gases discharged from the combustion zone into afterburner 96, thereby decreasing the temperature in the drying zone until the signal generated by controller 88 again exceeds the signal generated by sensor 72. When the latter occurs, the quantity of outlet gases discharged from the combustion zone into the afterburner is again controlled by minimum afterburner temperature controller 88.

The temperature in the combustion zone is controller by regulating the flow or relatively low temperature gases from the drying zone back into the combustion zone via valve 68, blower 70 and combustion chamber 46. Should the temperature in the combustion zone exceed the desired operating temperature, sensor 82 sends a signal to actuator 84, and the latter operates valve 68 to increase the flow of the recirculated gases. In addition, should the oxygen content of the recirculated gases, as measured by oxygen controller 80, become less than a predetermined minimum content, the controller sends a signal to actuator 81 for operating valve 56 to increase the supply of additional air.

Figure 2:
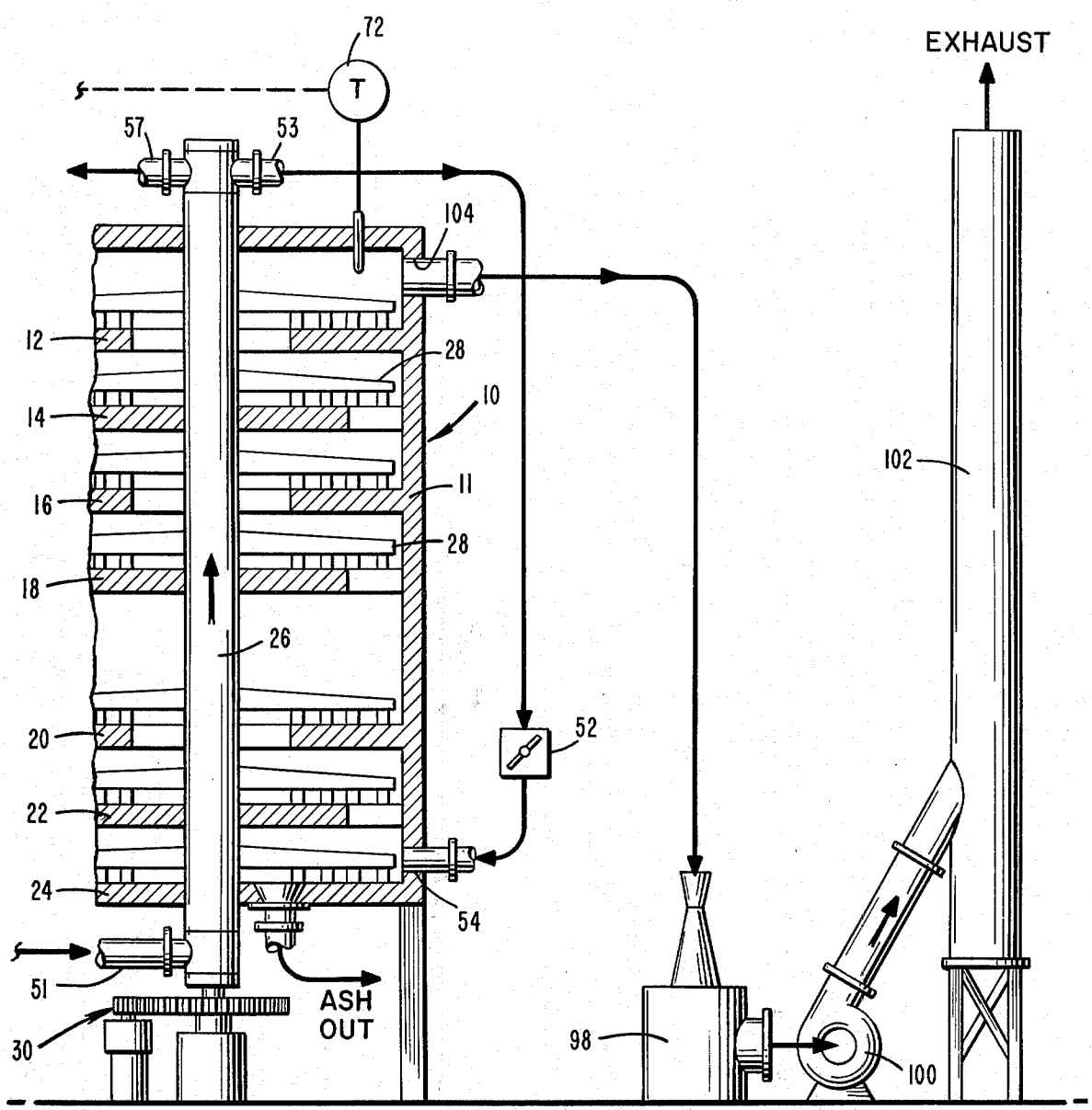
FIG. 2 is a sectional schematic view of a multiple hearth furnace employing a second embodiment of the control system of the invention.

The embodiment of the system shown in FIG. 2 is similar to that shown in FIG. 1, except that outlet gases are discharged from the furnace through an opening 104 in the upper end of the drying zone directly into scrubbing and cooling mechanism 98. This system eliminates the use of an afterburner, and thus is less costly from an equipment standpoint than the system shown in FIG. 1. This system obviously could be used only for installations in which there is no requirement that the furnace outlet gases be treated in an afterburner.

Figure 3:
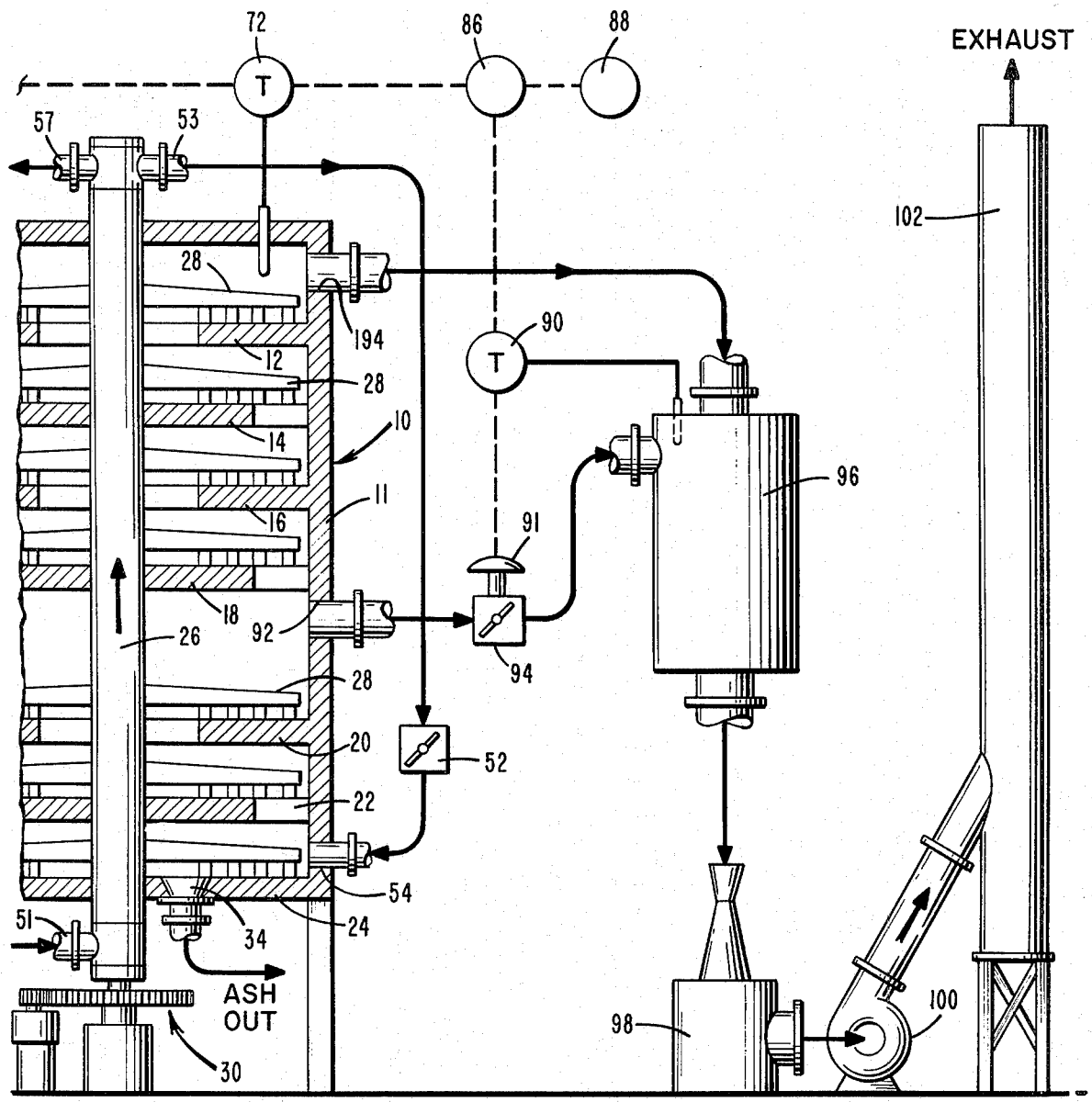
FIG. 3 is a sectional schematic view of a multiple hearth furnace employing a third embodiment of the control system of the invention.

The embodiment shown in FIG. 3 also is similar to the embodiment shown in FIG. 1, except that outlet gases are discharged from the furnace into afterburner 96 both from the drying zone and from the combustion zone through openings 104 and 92, respectively.

Figure 8:
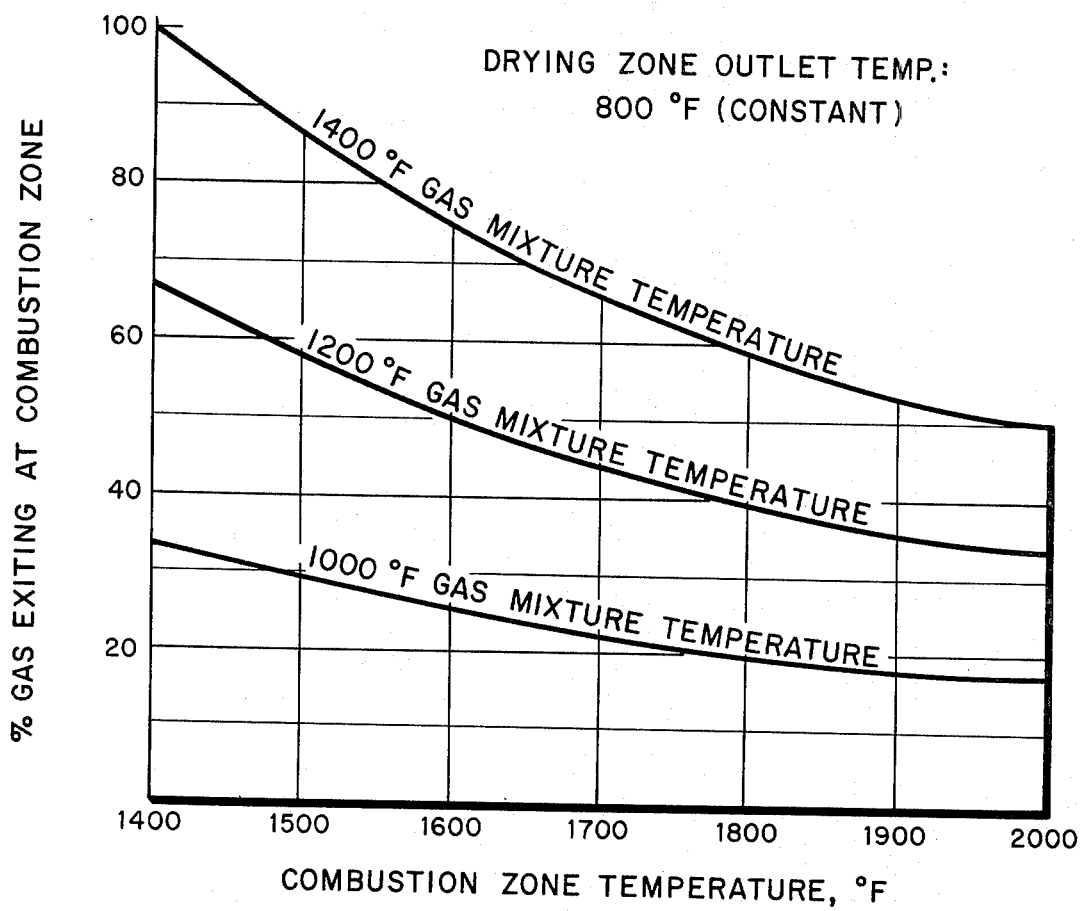
FIG. 8 is a graph showing the percentage of gases discharged directly from the combustion zone into an afterburner in which both combustion zone and drying zone gases are discharged, in relation to combustion zone temperature for various afterburner (gas mixture) temperatures.

The purpose of afterburner 96 is to subject the furnace outlet gases to a predetermined minimum temperature for a predetermined minimum period of time to insure that any uncombusted volatilized gaseous components contained in such gases are fully combusted in the afterburner, thereby eliminating any possibility that the gases as finally discharged into the atmosphere from stack 102 will possess undesirable odors. Typically, the afterburner is maintained at a minimum temperature of 1,400°F. and the outlet gases are retained therein for a period in the range of 1–3 seconds. FIG. 8 shows the percentage of the outlet gases that must be discharged from the combustion zone as a function of the combustion zone temperature, at a drying zone temperature of 800°F., to achieve various afterburner temperatures (mixture temperatures).

Figure 9:
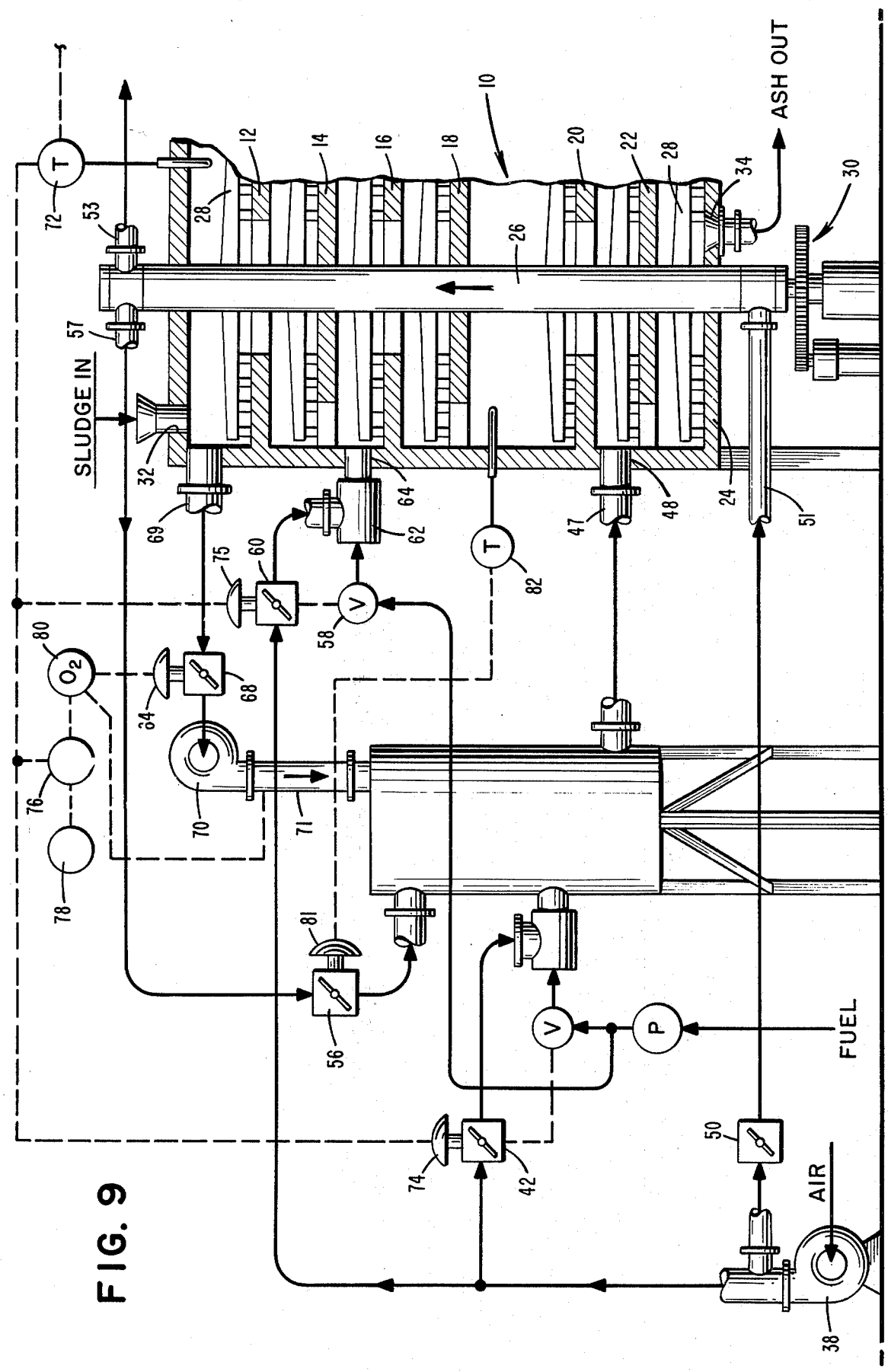
FIG. 9 is a sectional schematic view of a multiple hearth furnace employing a fourth embodiment of the control system of the invention.

The embodiment of the system of the invention shown in FIG. 9 employs a slightly different arrangement for controlling the heat balance in the combustion zone. In this embodiment oxygen controller 80 is operatively connected to actuator 84, and temperature sensor 82 is operatively connected to actuator 81. When the oxygen content of the recirculated gases becomes less than a predetermined minimum content, controller 80 sends a signal to actuator 84 for operating valve 68 to reduce the flow of recirculated gases. This causes the temperature in the combustion zone to increase. As a result sensor 82 sends a signal to actuator 81 for operating valve 56 to increase the flow of additional air. Thereafter, when the oxygen content of the recirculated gases, as measured by controller 80, has again reached a predetermined minimum content, the foregoing actions are reversed to increase the flow of recirculated gases and decrease the flow of additional air.

One of the primary features of the system of the invention is the controlled recirculation of gases from the drying zone back into the combustion zone for controlling the temperature in the combustion zone. As mentioned hereinabove, conventionally for incinerating waste water treatment sludge, 100 percent excess air is supplied to the combustion zone above the quantity of air required to provide the stoichiometric quantity of oxygen for combusting the combustible materials contained in the sludge. By utilizing recirculated gases from the drying zone, the quantity of excess air required to maintain a desired operating temperature in the combustion zone is greatly reduced, thereby reducing the quantity of fuel and capacities of the blowers employed.

From a heat balance standpoint, it is apparent that the combustion zone temperature will increase until the heat absorbed in the combustion zone environment equals the heat produced by combustion. The heat produced and heat absorbed may be expressed by formulas as follows:

Heat produced = Q sludge + Q fuel + Q air
Heat absorbed = Q water + Q refractory + Q air + Q ash + Q products + Q excess air + Q recirculated gases where:
Q sludge is the total heat content of the combustible material contained in the sludge;
Q fuel is the total heat content of the fuel;
Q air is the total sensible heat content of the air;
Q water is the total latent and sensible heat content of the free water;
Q refractory is the heat loss through the furnace structure;
Q ash is the sensible heat content of the uncombusted solid residue;
Q products is the heat contained in the products of stoichiometric combustion;
Q excess air is the heat content of the air supplied above stoichiometric requirements; and
Q recirculated gases is the heat content of the recirculated gases.

Of the seven parameters comprising the heat absorbed, all but Q excess air and Q recirculated gases are functions of the sludge and the structure of the furnace, and which, therefore, do not provide a basis for controlling the quantity of heat absorbed. Q excess air is the parameter which conventionally has been utilized for controlling the combustion zone temperature, and in particular for limiting the maximum combustion zone temperature. As previously stated, the amount of such air supplied usually is 100 percent above stoichiometric requirements. However, the controlled addition of Q recirculated gas provides a basis for controlling the combustion zone temperature and the excess air (including additional air) supplied. By controlling the quantity of recirculated gases supplied to the combustion zone, the combustion zone heat balance can be controllably varied without affecting the overall furnace heat balance.

The advantages of the system of the invention can be illustrated by a comparative example between the operation of a multiple hearth furnace using the system of the invention and using the conventional prior art system.

The process selected for this example is the incineration of waste water treatment sludge in the following amount and having the following composition:

| | | |
|---|---|---|
| 1,500 lb/hr | — | Combustible solids |
| 500 lb/hr | — | Uncombustible solids |
| 2,000 lb/hr | — | Total solids |
| 7,000 lb/hr | — | Water |
| 9,000 lb/hr | — | Total sludge |

Figure 4:
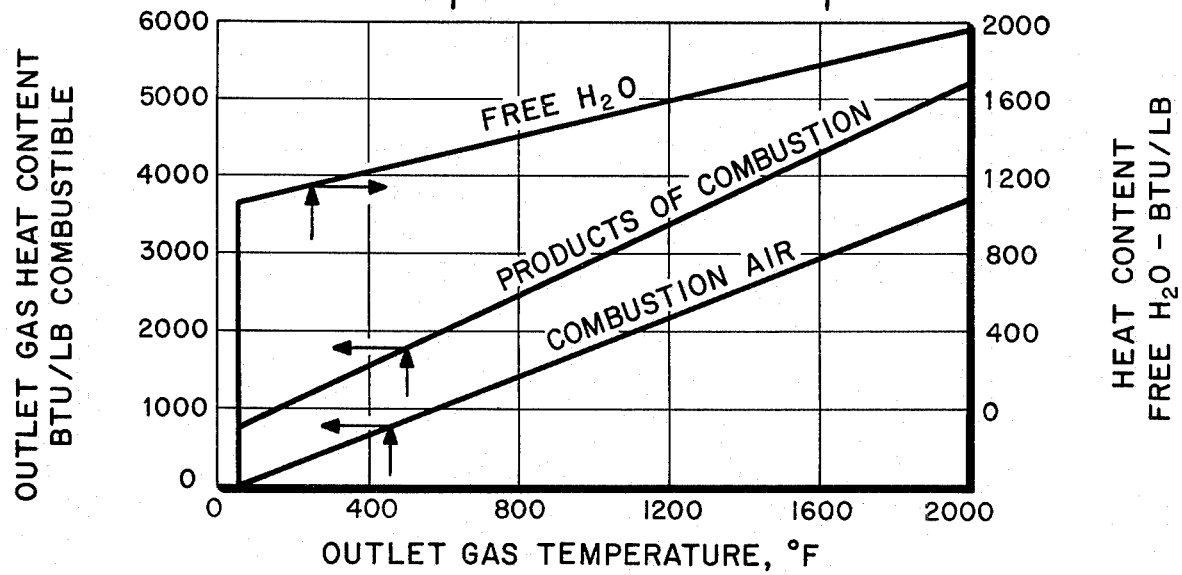
FIG. 4 is a chart showing the compositions of a typical waste water treatment sludge and the products of stoichiometric combustion of such sludge, and a graph showing the thermal properties of the products of combustion, the combustion air and the free water involved in the stoichiometric combustion of such sludge.
Figure 5:
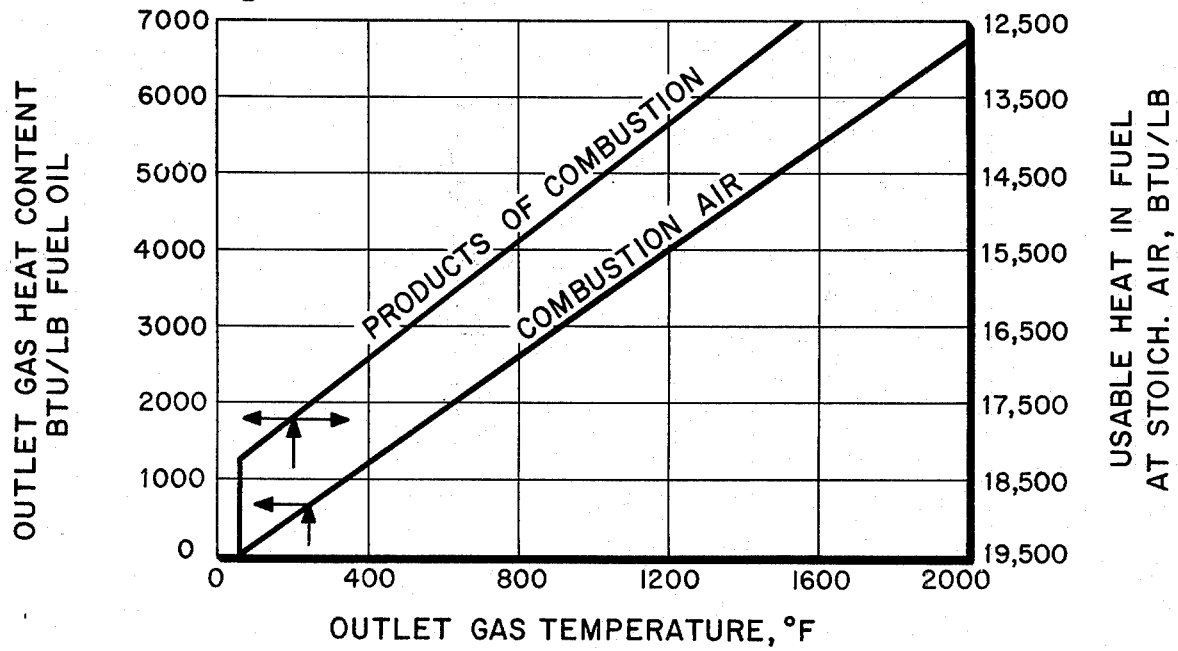
FIG. 5 is a chart showing the composition of the products of stoichiometric combustion of No. 2 fuel oil, and a graph showing the thermal properties of the products of combustion and the combustion air involved in the stoichiometric combustion of such oil.

The compositions of the combustible solids and the products of stoichiometric combustion of such solids and No. 2 fuel oil are shown in FIGS. 4 and 5. Additionally, FIGS. 4 and 5 show the thermal characteristics of the products of stoichiometric combustion, stoichiometric air and water vapor required for the heat balance.

The example assumes that the sensible heat in the ash and the refractory heat losses are negligible, and that the heat absorbed by the center shaft cooling air equals the heat in the air supplied to the combustion zone. The example also assumes a furnace outlet temperature of 800°F., and that the minimum excess air required for mixing is 50 percent above stoichiometric requirements. The latter is a conservative estimate and with a properly designed furnace and gas distribution equipment could be reduced to the range of 10–20 percent above stoichiometric requirements.

These assumptions reduce the overall furnace heat absorbed equation to the following:

Heat absorbed = Q water + Q products + Q excess air

Also, the combustion zone heat absorbed equation is reduced to the following:

Heat absorbed = Q water + Q products + Q excess air + Q recirculated gases

| | SYSTEM OF THE INVENTION | PRIOR ART SYSTEM |
|---|---|---|
| | Excess Air 50% | Excess Air 100% |
| | OVERALL HEAT BALANCE | |
| Heat produced | 1,500 × 10,000 = 15,000,000 Btu/hr | 1,500 × 10,000 = 15,000,000 Btu/hr |
| Heat absorbed | | |
| Q water | 7,000 × 1,450 = 10,200,000 Btu/hr | 7,000 × 1,450 = 10,200,000 Btu/hr |
| Q products | 1,500 × 2,450 = 3,680,000 Btu/hr | 1,500 × 2,450 = 3,680,000 Btu/hr |
| Q excess air | 1,500 × 725 = 1,090,000 Btu/hr | 1,500 × 1,450 = 2,180,000 Btu/hr |
| Total | 14,970,000 Btu/hr | 16,060,000 Btu/hr |
| Heat deficit | 0 | 1,060,000 Btu/hr |
| Net heat in oil at 10% excess air | 15,050 Btu/lb | 15,050 Btu/lb |
| Oil required | 0 | 70.5 lb/hr |
| | | 9.75 Gal/hr |

From the above heat balance and the product compositions shown in FIGS. 4 and 5, the masses of the outlet and combustion gases and the required capacities of the induced draft and combustion air blowers readily may be determined.

| | | |
|---|---|---|
| Outlet gas mass flow | | |
| Dry gas | 18,100 lb/hr | 25,200 lb/hr |
| Water vapor | 8,100 lb/hr | 8,180 lb/hr |
| Total | 26,200 lb/hr | 35,380 lb/hr |

A scrubber is used to clean the gas and cool it to 85°F. before discharge. Therefore, from pyschometric considerations, the outlet gas density is .072 lb/ft³ and humidity is .026 lb water/lb dry gas.

| | | |
|---|---|---|
| Induced draft blower required | | |
| Volume | 4,300 SCFM | 6,000 SCFM |
| Suction | −20 in WC | −20 in WC |
| BHP at .7 efficiency | 20.4 BHP | 28.6 BHP |

| | | |
|---|---|---|
| Combustion air mass flow | | |
| Air for combusting sludge | 1,500 × 7.93 × 1.5 = 17,700 lb/hr | 1,500 × 7.93 × 2 = 23,800 lb/hr |
| Air for combusting fuel | 0 | 70.5 × 14.4 × 1.1 = 1,100 lb/hr |
| Total | 17,700 lb/hr | 24,900 lb/hr |

| | | |
|---|---|---|
| Combustion blower required | | |
| Volume | 3,960 SCFM | 5,550 SCFM |
| Pressure | 20 in WC | 20 in WC |
| BHP at .7 efficiency | 17.7 BHP | 24.9 BHP |

COMBUSTION ZONE HEAT BALANCE

| | | |
|---|---|---|
| Combustion zone conditions | | |
| Moisture in sludge at entry | 40% | 40% |
| Zone temperature | 1,930°F. | 1,930°F. |

The composition and properties of the recirculated gases are calculated from the relationships derived in the overall heat balance and the relationships presented in FIGS. 4 and 5.

| | | |
|---|---|---|
| Gas density | .065 lb/ft³ | No recirculation |
| Specific heat | .31 Btu/lb | |
| Heat produced | 1,500 × 10,000 = 15,000,000 Btu/hr | 1,500 × 10,000 = 15,000,000 Btu/hr |
| Heat absorbed | | |
| Q water | 1,350 × 1,950 = 2,640,000 Btu/hr | 1,350 × 1,950 = 2,640,000 Btu/hr |
| Q products | 1,500 × 5,000 = 7,500,000 Btu/hr | 1,500 × 5,000 = 7,500,000 Btu/hr |
| Q excess air | 1,500 × 1,620 = 2,430,000 Btu/hr | 1,500 × 3,240 = 4,860,000 Btu/hr |
| Total | 12,570,000 Btu/hr | 15,000,000 Btu/hr |
| Excess heat | 2,430,000 Btu/hr | 0 |
| Recirculation gas mass flow required | $\dfrac{2,430,000}{} = 7,000$ lb/hr | No recirculation |

-continued
COMBUSTION ZONE HEAT BALANCE
.31 (1930–800)

| | | |
|---|---|---|
| Recirculation blower required | | None |
| Volume | 1,800 SCFM | |
| Temperature | 800°F. | |
| Suction | 4 in WC | |
| Horsepower | 4.5 BHP | |

Summary of energy requirements for 800°F. outlet temperature operation.

| | | |
|---|---|---|
| Fuel | None required | 9.75 Gal/hr |
| Blower horsepower required | | |
| Induced draft blower | 20.4 BHP | 28.6 BHP |
| Combustion blower | 17.7 BHP | 24.9 BHP |
| Recirculation blower | 4.5 BHP | — |
| Total | 42.6 BHP | 53.5 BHP |

The prior art system of the foregoing example represents the typical operation of a multiple hearth sludge incinerator as now used by many municipalities throughout the country. The economic advantages provided by the system of the present invention for incinerating the same quantity of sludge are apparent from the summary table.

A comparative summary for the system of the invention and the prior art system for the same conditions as in the previous example except that the outlet gas temperature is increased from 800°F. to 1,400°F. is as follows:

| | System Of The Invention | Prior Art System |
|---|---|---|
| | Outlet gas 1,400° F. | |
| Fuel | 46 Gal/hr | 70.75 Gal/hr |
| Blower horsepower required | | |
| Induced draft blower | 26.2 BHP | 37.0 BHP |
| Combustion blower | 23.0 BHP | 31.4 BHP |
| Recirculation blower | 14.9 BHP | — |
| Total | 64.1 BHP | 68.4 BHP |

Figure 6:
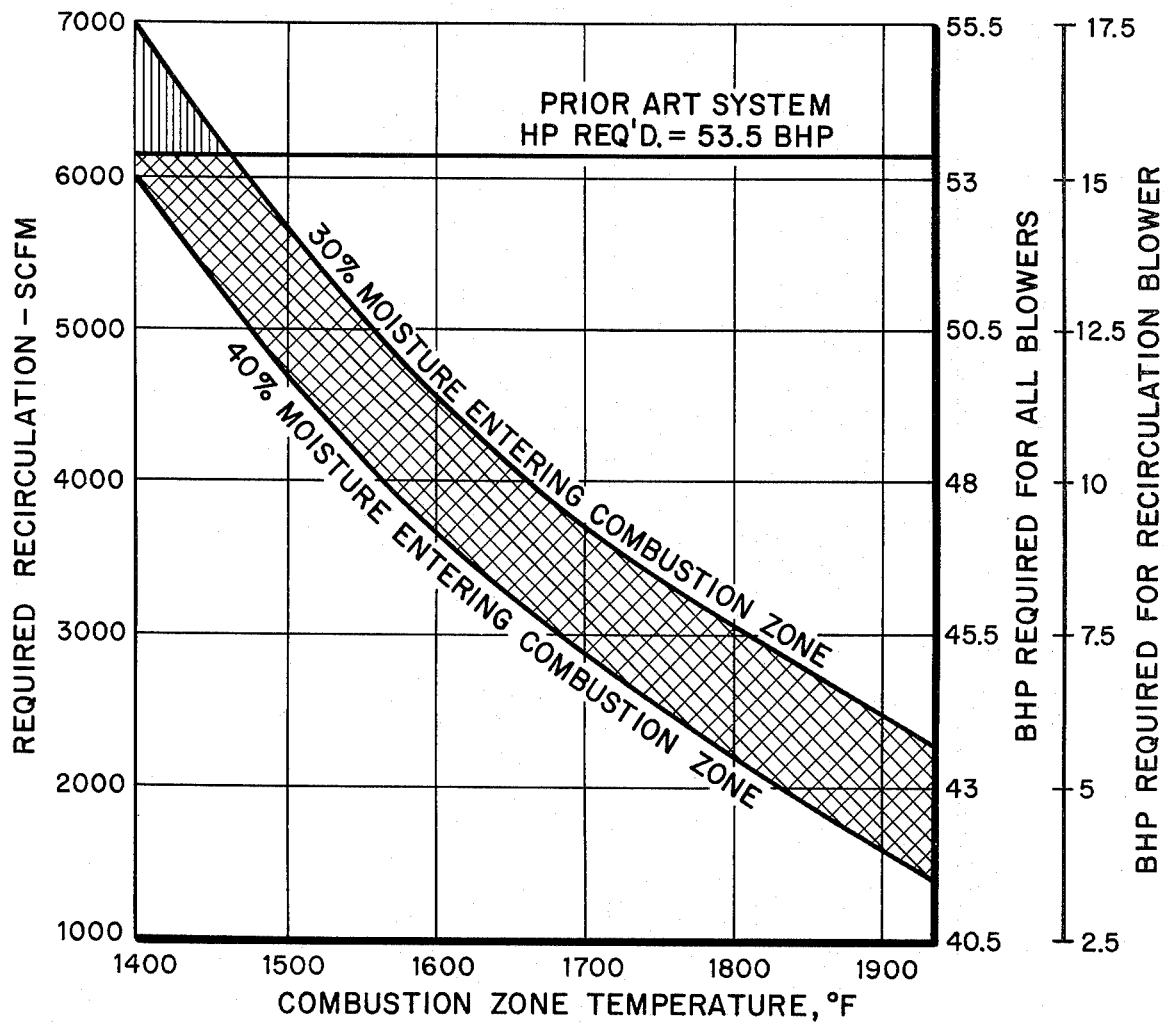
FIG. 6 is a graph showing the range of operating conditions obtainable with the control system of the invention and the fixed operating conditions for the conventional prior art control system for a furnace outlet temperature of 800°F.
Figure 7:
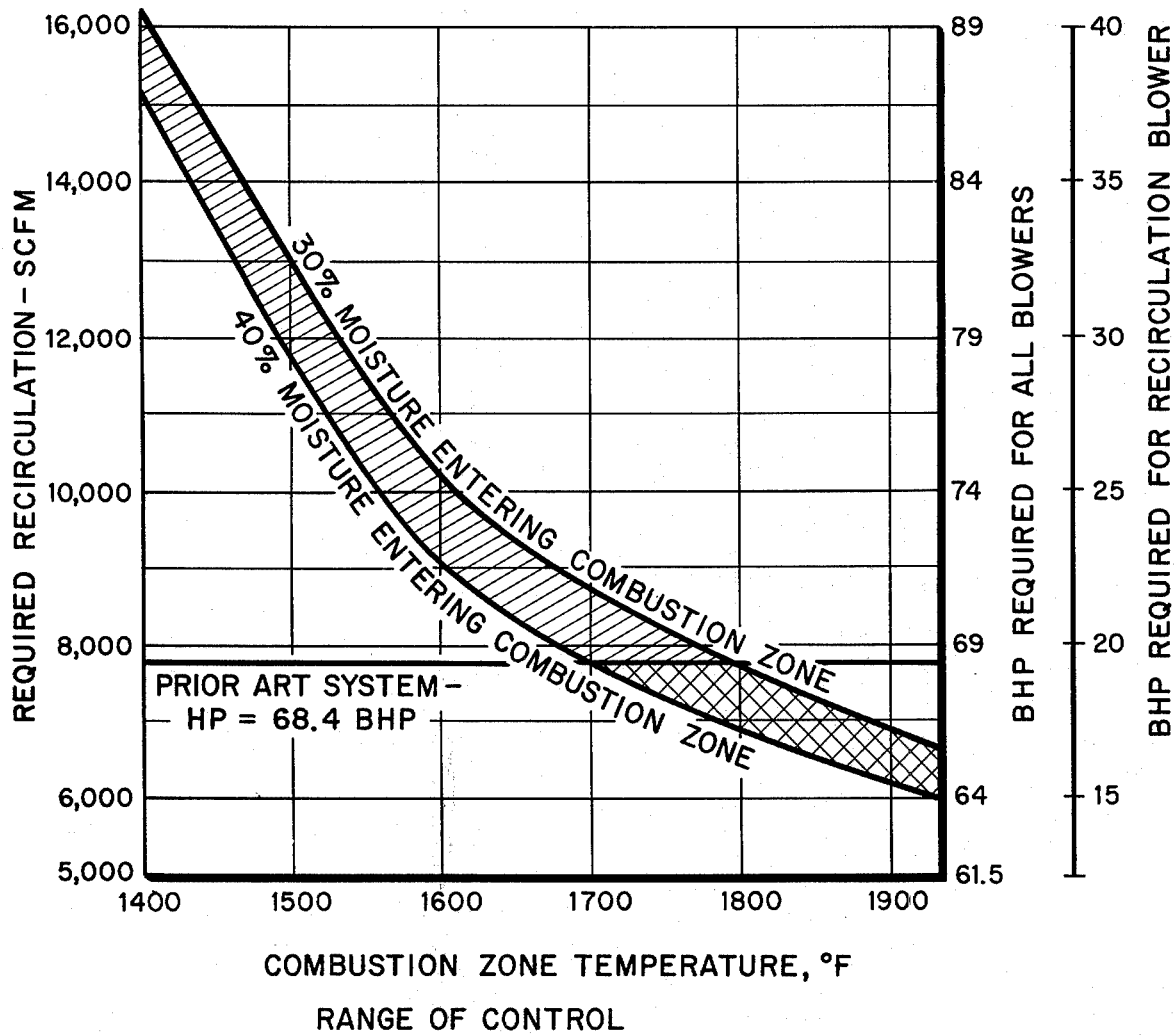
FIG. 7 is a graph showing the range of operating conditions obtainable with the control system of the invention and the fixed operating conditions for the conventional prior art system for a furnace outlet temperature of 1,400°F.

In addition to the energy savings for comparable operating conditions, as illustrated above, the system of the present invention offers substantial flexibility in the operating characteristics of the furnace. FIGS. 6 and 7 illustrate the variety of operating conditions which can be maintained and controlled by the system without altering the fuel requirements. These variations permit materials with diverse processing requirements to be processed in the most efficient manner and at the lowest possible temperature consistent with material requirements. FIG. 6 specifically illustrates the effect of variations in the recirculated gas flow and water content of the sludge on combustion temperature at gas outlet temperature of 800°F. FIG. 7 is similar to FIG. 6 except that the gas outlet temperature is 1,400°F.

while the invention has been described in particularity with respect to certain presently preferred embodiments, the scope thereof shall be limited solely by the scope of the appended claims.

I claim

1. In a method for combusting a combustible material in a multiple hearth furnace having a plurality of superposed hearths defining an upper drying zone, an intermediate combustion zone and a lower cooling zone, said method comprising the steps of:
   introducing a mixture containing the combustible material and water into the upper end of the furnace,
   passing the mixture downwardly through the drying zone wherein the mixture is dried by exposure to gases heated in the combustion zone,
   passing the dried mixture downwardly from the drying zone through the combustion zone wherein the combustible material is combusted using air as the oxidant, the gases produced by the combustion of said material flowing upwardly into the drying zone to provide heat for drying said mixture,
   supplying air to the combustion zone to provide oxygen for combusting the combustible material,
   passing the solid residue uncombusted by said combustion downwardly from the combustion zone through the cooling zone wherein the residue is cooled by exposure to gases cooler than the gases produced by said combustion, and
   removing the cooled residue from the lower end of the furnace;
   the improvement comprising the steps of:
   recirculating gases from the drying zone back into the combustion zone to provide relatively low temperature gases in the combustion zone for absorbing excess heat generated by said combustion,
   sensing the temperature in the combustion zone, and
   controlling the flow of said recirculated gases in response to said sensed temperature to provide the quantity of said recirculated gases in the combustion zone required to maintain said combustion zone temperature at a substantially constant predetermined temperature independently of the heat produced in the combustion zone.

2. A method as recited in claim 1, further comprising the steps of:
   supplying fuel to the combustion zone,
   sensing the temperature in the drying zone, and
   controllably increasing the flow of fuel and air to the combustion zone in response to said sensed drying zone temperature should said drying zone temperature become less than a predetermined minimum temperature.

3. A method as recited in claim 2, wherein said fuel and air are intermixed and combusted prior to entering the combustion zone.

4. A method as recited in claim 1, further comprising the steps of:
   supplying fuel and air to the drying zone,
   sensing the temperature in the drying zone, and
   controllably increasing the flow of fuel and air to the drying zone in response to said sensed drying zone temperature should said drying zone temperature become less than a predetermined minimum temperature.

5. A method as recited in claim 1, wherein the amount of air supplied to the combustion zone is at least the amount required to provide the stoichiometric quantity of oxygen required to completely combust the combustible material.

6. A method as recited in claim 1, wherein the amount of air supplied to the combustion zone is less than the amount required to provide the stoichiometric quantity of oxygen required to completely combust the combustible material.

7. A method as recited in claim 1 further comprising the steps of:
supplying additional air to the combustion zone,
sensing the temperature in the drying zone, and controllably increasing the flow of said additional air to the combustion zone in response to said sensed drying zone temperature should said drying zone temperature exceed a predetermined maximum temperature.

8. A method as recited in claim 1, further comprising the steps of:
generating a first signal in response to the temperature in the drying zone,
generating a second signal representing a predetermined minimum quantity of additional air to be supplied to the combustion zone, the magnitude of said first signal exceeding the magnitude of said second signal in the event said drying zone temperature exceeds a predetermined maximum temperature,
comparing said first and second signals, and
controllably supplying said additional air to the combustion zone in response to the higher in magnitude of said first and second signals to insure that an increased quantity of said additional air will be supplied to the combustion zone should said drying zone temperature exceed said maximum temperature.

9. A method as recited in claim 1, further comprising the steps of:
generating a first signal in response to the temperature in the drying zone,
generating a second signal representing a predetermined minimum quantity of gases to be discharged directly from the combustion zone, the magnitude of said first signal exceeding the magnitude of said second signal in the event the temperature in the drying zone exceeds a predetermined maximum temperature,
comparing said first and second signals, and
controllably discharging gases directly from the combustion zone in response to the higher in magnitude of said first and second signals to insure that an increased quantity of gases will be discharged directly from the combustion zone should said drying zone temperature exceed said predetermined maximum temperature.

10. A method as recited in claim 9, further comprising the steps of:
discharging said discharged combustion zone gases into an afterburner, said minimum quantity of said discharged gases being the quantity thereof required to maintain a predetermined minimum temperature in said afterburner,
retaining said discharged combustion zone gases in said afterburner at said predetermined minimum temperature for a predetermined minimum period of time to insure that any uncombusted volatilized gaseous components of said combustible material contained therein are fully combusted in said afterburner, and
exhausting said discharged combustion zone gases from said afterburner.

11. A method as recited in claim 9, further comprising the steps of:
discharging gases directly from the drying zone into an afterburner,
maintaining the temperature in said afterburner at a predetermined minimum temperature,
retaining said discharged drying zone gases in said afterburner at said predetermined minimum temperature for a predetermined minimum period of time to insure that any uncombusted volatilized gaseous components of said combustible material contained therein are fully combusted in said afterburner, and
exhausting said discharged drying zone gases from said afterburner.

12. A method as recited in claim 1, wherein said combustible material comprises the combustible organic solids contained in a waste water treatment sludge.

13. In a method for combusting a combustible material in a multiple hearth furnace having a plurality of superposed hearths defining an upper drying zone, an intermediate combustion zone and a lower cooling zone, said method comprising the steps of:
introducing a mixture containing the combustible material and water into the upper end of the furnace,
passing the mixture downwardly through the drying zone wherein the mixture is dried by exposure to gases heated in the combustion zone,
passing the dried mixture downwardly from the drying zone through the combustion zone wherein the combustible material is combusted using air as the oxidant, the gases produced by the combustion of said material flowing upwardly into the drying zone to provide heat for drying said mixture,
supplying air to the combustion zone to provide oxygen for combusting the combustible material,
passing the solid residue uncombusted by said combustion downwardly from the combustion zone through the cooling zone wherein the residue is cooled by exposure to gases cooler than the gases produced by said combustion, and
removing the cooled residue from the lower end of the furnace;
the improvement comprising the steps of:
recirculating gases from the drying zone back into the combustion zone to provide relatively low temperature gases in the combustion zone for absorbing excess heat generated by said combustion,
sensing the temperature in the combustion zone, and controlling the flow of said recirculated gases in response to said sensed temperature to provide the quantity of said recirculated gases in the combustion zone required to achieve a balance between the heat produced and the heat absorbed in the combustion zone.

14. In a method for combusting a combustible material in a multiple hearth furnace having a plurality of superposed hearths defining an upper drying zone, an intermediate combustion zone and a lower cooling zone, said method comprising the steps of:
introducing a mixture containing the combustible material and water into the upper end of the furnace,
passing the mixture downwardly through the drying zone wherein the mixture is dried by exposure to gases heated in the combustion zone, passing the dried mixture downwardly from the drying zone through the combustion zone wherein the combustible material is combusted using air as the oxidant, the gases produced by the combustion of said material flowing upwardly into the drying zone to provide heat for drying said mixture, supplying air to the combustion zone to provide oxygen for combusting the combustible material.

passing the solid residue uncombusted by said combustion downwardly from the combustion zone through the cooling zone wherein the residue is cooled by exposure to gases cooler than the gases produced by said combustion, and removing the cooled residue from the lower end of the furnace;

the improvement comprising the steps of:

recirculating gases from the drying zone back into the combustion zone to provide relatively low temperature gases in the combustion zone for absorbing excess heat generated by said combustion, measuring the oxygen content of said recirculated gases, comparing the oxygen content of said recirculated gases with a predetermined minimum oxygen content, and controllably supplying additional air to the combustion zone should the oxygen content of said recirculated gases become less than said minimum content to provide the quantity of said additional air in the combustion zone required to achieve a balance between the heat produced and the heat absorbed in the combustion zone and to increase the oxygen content of said recirculated gases above said minimum content.

15. A method as recited in claim 14, wherein said air, said recirculated gases and said additional air are intermixed before entering the combustion zone.

16. In a method for combusting a combustible material in a multiple hearth furnace having a plurality of superposed hearths defining an upper drying zone, an intermediate combustion zone and a lower cooling zone, said method comprising the steps of:

introducing a mixture containing the combustile material and water into the upper end of the furnace, passing the mixture downwardly through the drying zone wherein the mixture is dried by exposure to gases heated in the combustion zone, passing the dried mixture downwardly from the drying zone through the combustion zone wherein the combustion material is combusted using air as the oxidant, the gases produced by the combustion of said material flowing upwardly into the drying zone to provide heat for drying said mixture, supplying air to the combustion zone to provide oxygen for combusting the combustible material, passing the solid residue uncombusted by said combustion downwardly from the combustion zone through the cooling zone wherein the residue is cooled by exposure to gases cooler than the gases produced by said combustion, and removing the cooled residue from the lower end of the furnace;

the improvement comprising the steps of:

recirculating gases from the drying zone back into the combustion zone to provide relatively low temperature gases in the combustion zone for absorbing excess heat generated by said combustion, measuring the oxygen content of said recirculated gases, reducing the flow of said recirculated gases should the oxygen content thereof become less than a predetermined minimum content, sensing the temperature in said combustion zone, and supplying additional air to said combustion zone in response to said sensed temperature to provide the quantity of said additional air in the combustion zone required to maintain said combustion zone temperature at a substantially constant predetermined temperature independently of the heat produced in the combustion zone and to increase the oxygen content of said recirculated gases above said minimum content.

17. In a multiple hearth furnace having a plurality of superposed hearths defining an upper drying zone, an intermediate combustion zone and a lower cooling zone, said furnace comprising:

an opening in the upper end of the furnace through which a mixture containing a combustible material and water is introduced into the furnace, means for passing the mixture downwardly through the drying zone wherein the mixture is dried by exposure to gases heated in the combustion zone, means for passing the dried mixture downwardly from the drying zone through the combustion zone wherein the combustible material is combusted using air as the oxidant, the gases produced by the combustion of said material flowing upwardly into the drying zone to provide heat for drying said mixture.

means for supplying air to the combustible zone to provide oxygen for combusting the combustible material, means for passing the solid residue uncombusted by said combustion downwardly from the combustion zone through the cooling zone wherein the residue is cooled by exposure to gases cooler than the gases produced by said combustion, and an opening in the lower end of the furnace through which the cooled residue is removed from the furnace;

the improvement comprising:

means for recirculating gases from the drying zone back into the combustion zone to provide relatively low temperature gases in the combustion zone for absorbing excess heat generated by said combustion, means for sensing the temperature in the combustion zone, and means for controlling the flow of said recirculated gases in response to said sensed temperature to provide the quantity of said recirculated gases in the combustion zone required to maintain said combustion zone temperature at a substantially constant predetermined temperature independently of the heat produced in the combustion zone.

18. A furnace as recited in claim 17, further comprising:

means for supplying fuel to the combustion zone, means for sensing the temperature in the drying zone, and means for controllably increasing the flow of fuel and air to the combustion zone in response to said sensed drying zone temperature should said drying zone temperature become less than a predetermined minimum temperature.

19. A furnace as recited in claim 18, further comprising means for intermixing and combusting said fuel and air prior to the entrance thereof into the combustion zone.

20. A furnace as recited in claim 17, further comprising:
means for supplying fuel and air to the drying zone,
means for sensing the temperature in the drying zone, and
means for controllably increasing the flow of fuel and air to the drying zone in response to said sensed drying zone temperature should said drying zone temperature become less than a predetermined minimum temperature.

21. A furnace as recited in claim 17, further comprising:
means for supplying additional air to the combustion zone,
means for sensing the temperature in the drying zone, and
means for controllably increasing the flow of said additional air to the combustion zone in response to said sensed drying zone temperature should said drying zone temperature exceed a predetermined maximum temperature.

22. A furnace as recited in claim 17, further comprising:
means for generating a first signal in response to the temperature in the drying zone,
means for generating a second signal representing a predetermined minimum quantity of additional air to be supplied to the combustion zone, the magnitude of said first signal exceeding the magnitude of said second signal in the event said drying zone temperature exceeds a predetermined maximum temperature,
means for comparing said first and second signals, and
means for controllably supplying said additional air to the combustion zone in response to the higher in magnitude of said first and second signals to insure that an increased quantity of said additional air will be supplied to the combustion zone should said drying zone temperature exceed said maximum temperature.

23. A furnace as recited in claim 17, further comprising:
means for generating a first signal in response to the temperature in the drying zone,
means for generating a second signal representing a predetermined minimum quantity of gases to be discharged directly from the combustion zone, the magnitude of said first signal exceeding the magnitude of said second signal in the event the temperature in the drying zone exceeds a predetermined maximum temperature,
means for comparing said first and second signals, and
means for controllably discharging gases directly from the combustion zone in response to the higher in magnitude of said first and second signals to insure that an increased quantity of gases will be discharged directly from the combustion zone should said drying zone temperature exceed said predetermined maximum temperature.

24. In a multiple hearth furnace having a plurality of superposed hearths defining an upper drying zone, an intermediate combustion zone and a lower cooling zone, said furnace comprising:
an opening in the upper end of the furnace through which a mixture containing a combustible material and water is introduced into the furnace.
means for passing the mixture downwardly through the drying zone wherein the mixture is dried by exposure to gases heated in the combustion zone,
means for passing the dried mixture downwardly from the drying zone through the combustion zone wherein the combustible material is combusted using air as the oxidant, the gases produced by the combustion of said material flowing upwardly into the drying zone to provide heat for drying said mixture,
means for supplying air to the combustion zone to provide oxygen for combusting the combustible material,
means for passing the solid residue uncombusted by said combustion downwardly from the combustion zone through the cooling zone wherein the residue is cooled by exposure to gases cooler than the gases produced by said combustion, and
an opening in the lower end of the furnace through which the cooled residue is removed from the furnace;
the improvement comprising:
means for recirculating gases from the drying zone back into the combustion zone to provide relatively low temperature gases in the combustion zone for absorbing excess heat generated by said combustion,
means for measuring the oxygen content of said recirculated gases,
means for comparing the oxygen content of said recirculated gases with a predetermined minimum oxygen content, and
means for controllably supplying additional air to the combustion zone should the oxygen content of said recirculated gases become less than said minimum content to provide the quantity of said additional air in the combustion zone required to achieve a balance between the heat produced and the heat absorbed in the combustion zone and to increase the oxygen content of said recirculated gases above said minimum content.

25. A furnace as recited in claim 24, further comprising means for intermixing said air, said recirculated gases and said additional air before the entrance thereof into the combustion zone.

26. In a multiple hearth furnace having a plurality of superposed hearths defining an upper drying zone, an intermediate combustion zone and a lower cooling zone, said furnace comprising:
an opening in the upper end of the furnace through which a mixture containing a combustible material and water is introduced into the furnace,
means for passing the mixture downwardly through the drying zone wherein the mixture is dried by exposure to gases heated in the combustion zone,
means for passing the dried mixture downwardly from the drying zone through the combustion zone wherein the combustible material is combusted using air as the oxidant, the gases produced by the combustion of said material flowing upwardly into the drying zone to provide heat for drying said mixture.

means for supplying air to the combustion zone to provide oxygen for combusting the combustible material, means for passing the solid residue uncombusted by said combustion downwardly from the combustion zone through the cooling zone wherein the residue is cooled by exposure to gases cooler than the gases produced by said combustion, and an opening in the lower end of the furnace through which the cooled residue is removed from the furnace;

the improvement comprising:

means for recirculating gases from the drying zone back into the combustion zone to provide relatively low temperature gases in the combustion zone for absorbing excess heat generated by said combustion, means for measuring the oxygen content of said recirculated gases, means for reducing the flow of said recirculated gases should the oxygen content thereof become less than a predetermined minimum content, means for sensing the temperature in said combustion zone, and means for supplying additional air to said combustion zone in response to said sensed temperature to provide the quantity of said additional air in the combustion zone required to maintain said combustion zone temperature at a substantially constant predetermined temperature independently of the heat produced in the combustion zone and to increase the oxygen content of said recirculated gases above said minimum content.

* * * * *